United States Patent [19]

Nakane et al.

[11] Patent Number: 4,968,235
[45] Date of Patent: Nov. 6, 1990

[54] MOLD FOR MANUFACTURING SKIN COVERED FOAMED PLASTIC SEAT

[75] Inventors: Katsunori Nakane; Makoto Shoji, both of Ayase, Japan

[73] Assignee: Ikeda Bussan Co., Ltd., Kanagawa, Japan

[21] Appl. No.: 410,122

[22] Filed: Sep. 20, 1989

[51] Int. Cl.⁵ .................. B29C 39/10; B68G 7/00
[52] U.S. Cl. ........................ 425/4 R; 249/93; 249/95; 264/46.4; 425/117; 425/125; 425/DIG. 48
[58] Field of Search .................. 425/4 R, 817 R, 117, 425/125, 388, DIG. 48; 249/91, 93, 95, 83; 264/46.4, 46.6, 46.8

[56] References Cited

U.S. PATENT DOCUMENTS

| | | | |
|---|---|---|---|
| 4,447,200 | 5/1984 | Weisner et al. | 425/388 |
| 4,824,070 | 4/1989 | Mizuno et al. | 425/117 |
| 4,833,741 | 5/1989 | Mizuno et al. | 264/46.6 |

Primary Examiner—Jay H. Woo
Assistant Examiner—Khanh P. Nguyen
Attorney, Agent, or Firm—Weiser & Stapler

[57] ABSTRACT

A mold for manufacturing a skin covered foamed plastic seat capable of effectively dealing with the variations in shape and position of the trim ends. The mold includes stopper means for fastening the trim ends attached to the edges of the skin cover, located between the upper mold and lower mold separately from a space into which a liquid foam resin is to be poured, each of the stopper means having a slit through which one trim end is inserted, and a top face portion to which both ends of the trim end are to be hooked.

2 Claims, 3 Drawing Sheets

MOLD FOR MANUFACTURING SKIN COVERED FOAMED PLASTIC SEAT

BACKGROUND OF THE INVENTION

1. Field of the Invention

The present invention relates to a mold for manufacturing a skin covered foamed plastic seat.

2. Description of the Background Art

Car seat cushions and seat backs have been made of a pad member covered by a skin cover. The pad member and the skin cover used to be manufactured separately and combined together later, but it has become fashionable to manufacture a skin covered pad member altogether by making the foamed plastic inside the skin cover placed over a molding surface, so that the process of combining at a later time may be omitted.

An example of such a skin covered foamed plastic seat is shown in FIG. 1, in which the skin covered foamed plastic seat comprises a pad member 1 covered by a skin cover 2. At the both ends of the skin cover 2, there are cord-like trim ends 3 sewed to the skin cover 2 to be attached to a seat frame 5 by means of worm clips 4.

With this mechanism of attaching the trim ends 3 to the seat frame 5, the following care has been taken in manufacturing the skin covered foamed plastic seat in order to avoid impregnating the ends of the skin cover 2 with the liquid foam resin to be poured over the skin cover 2 which will subsequently become the pad member 1.

Namely, in a conventional mold for manufacturing the skin covered foamed plastic seat shown in FIG. 2, which comprises a lower mold 6 over which the skin cover 2 is placed and an upper mold 8 to be assembled with the lower mold 6, ends of the skin cover 2 will be pinched between the upper mold 8 and the lower mold 6 so as to be separated from a space formed between the upper mold 8 and the lower mold 6 into which the liquid foam resin will be poured, and the trim ends 3 attached to the ends of the skin cover 2 will be fastened to the receptacles 9, before the liquid foam resin is poured into the space between the upper mold 8 and the lower mold 6.

However, in such a conventional mold for manufacturing the skin covered foamed plastic seat, the receptacles 9 cannot deal with even a slight deviation in shape and position of the trim ends 3, so that the variations in shape and position of the trim ends 3 which occurred in the preparation could not have been coped with effectively.

SUMMARY OF THE INVENTION

It is therefore an object of the present invention to provide a mold for manufacturing a skin covered foamed plastic seat capable of effectively dealing with the variations in shape and position of the trim ends.

This object is achieved by the present invention by providing a mold for manufacturing a skin covered foamed plastic seat, comprising a mold for manufacturing a skin covered foamed plastic seat, comprising a lower mold over which a skin cover having trim ends attached at its edges is to be placed, an upper mold to be assembled with the lower mold, and stopper means for fastening the trim ends attached to the ends of the skin cover, located between the upper mold and lower mold separately from a space into which a liquid foam resin is to be poured, each of the stopper means having a slit through which one trim end is inserted, and a top face portion to which both ends of the trim end are to be hooked.

Other features and advantages of the present invention will become apparent from the following description taken in conjunction with the accompanying drawings.

DETAILED DESCRIPTION OF THE PREFERRED EMBODIMENTS

Figure 1:
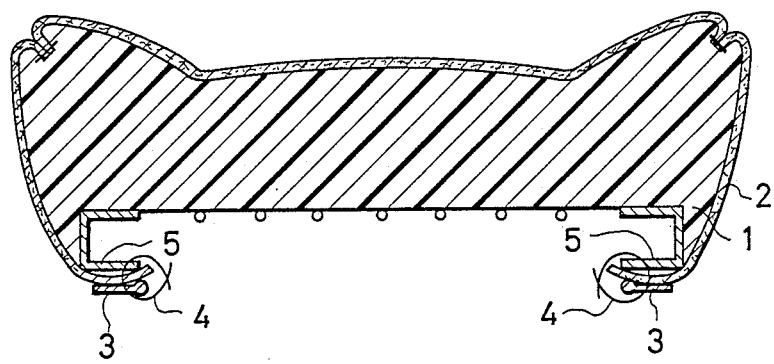
FIG. 1 is a cross sectional view of a skin covered foamed plastic seat, attached to a seat frame.
Figure 2:
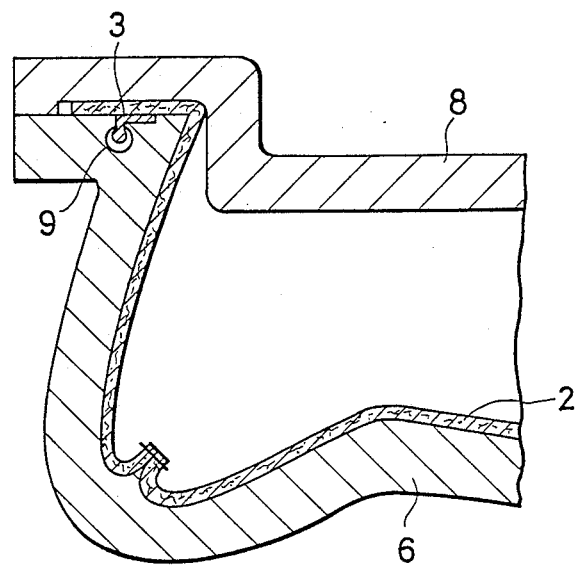
FIG. 2 is a magnified cross sectional view of a receptacle for a trim end in a conventional mold for manufacturing the skin covered foamed plastic seat.
Figure 3:
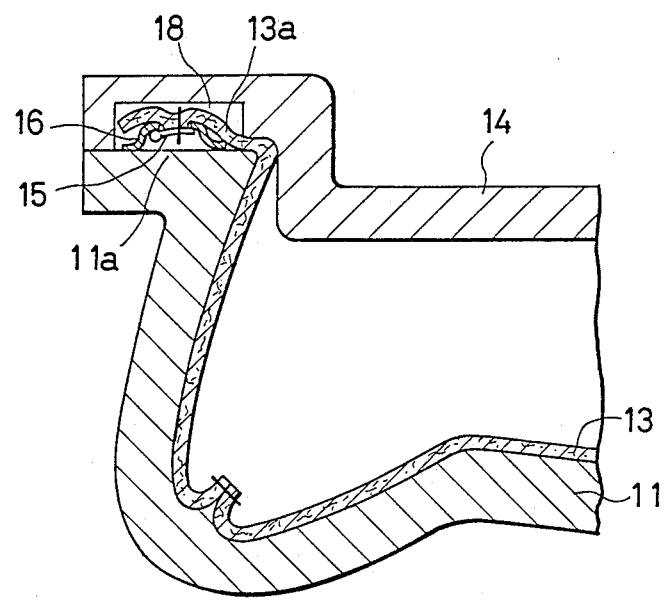
FIG. 3 is a magnified cross sectional view of a receptacle for a trim end in one embodiment of a mold for manufacturing the skin covered foamed plastic seat according to the present invention.

Referring now to FIG. 3, there is shown one embodiment of a mold for manufacturing a skin covered foamed plastic seat according to the present invention.

In this embodiment, a mold comprises a lower mold 11 over which a skin cover 13 is to be placed, and an upper mold 14 to be assembled with the lower mold 11.

In this mold, an end 13a of the skin cover 13 will be pinched between the upper mold 14 and the lower mold 11 so as to be separated from a space formed between the upper mold 14 and the lower mold 11 into which the liquid foam resin will be poured, and a trim end 15 attached to the end 13a of the skin cover 13 will be fasten to a stopper 16 provided in a space formed by a flat edge 11a of the lower mold 11 and a concavity 18 of the upper mold 14.

Figure 4:
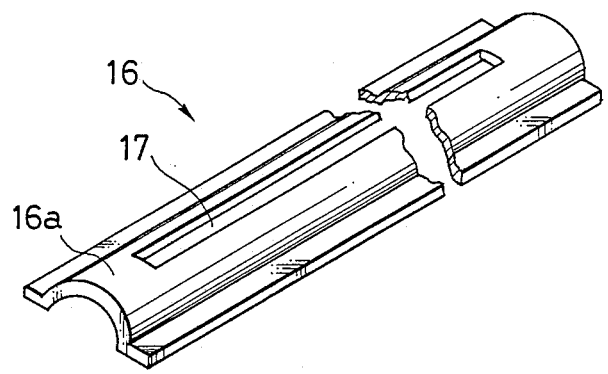
FIG. 4 is a perspective view of a stopper for a trim end in the embodiment of FIG. 3.

As shown in FIG. 4, the stopper 16 is a bar-like object with a hat-like cross section having an elongated slit 17 along its length on its top face 16a.

Figure 5A:
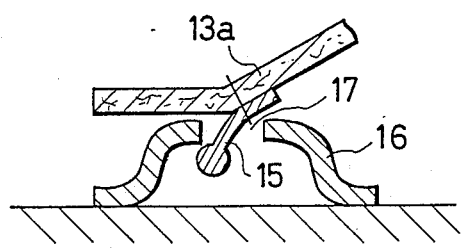
FIGS. 5(A) and (B) are cross sectional illustrations of the trim end and the stopper in the embodiment of FIG. 3 for explaining the manner of fastening the trim end to the stopper.
Figure 5B:
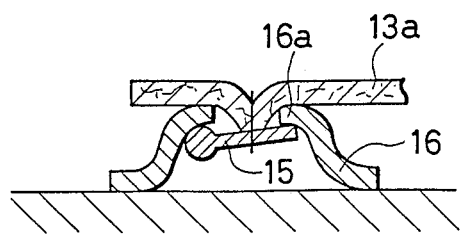

The trim end 15 will be fastened as shown in FIGS. 5(A) and (B). Namely, after the skin cover 13 has been placed over the lower mold 11, the trim end 15 at the edge 13a of the skin cover 13 will be inserted into the slit 17 of the stopper 16 from a top end of the trim end 15 first as in shown FIG. 5(A), and when a bottom end of the trim end 15 is inserted in the slit 17, the edge 13a of the skin cover 13 is pulled such that the top and bottom ends of the trim end 15 will be hooked to a back of the top face 16a of the stopper 16 as shown in FIG. 5(B). Here, it is possible to deal with the variations in shape and position of the trim end 15 not only because of the hat-like shape of the stopper 16 itself, but also because of the elongated shape of the slit 17.

The manufacturing of the skin covered foamed plastic seat can then be carried out as usual, by either assembling the upper mold 14 with the lower mold 11 and then pouring in the liquid foam resin, or by filling the lower mold 11 with the liquid foam resin first and then by assembling the upper mold 14 with the lower mold 11, so that the skin covered foamed plastic seat can be obtained after the foaming process of the liquid foam resin is completed.

As explained, according to the present invention it is possible to deal with the variations in shape and position of the trim end 15 effectively.

It is to be noted that many modifications and variations of the above embodiment may be made without departing from the novel and advantageous features of the present invention. Accordingly, all such modifications and variations are intended to be included within the scope of the appended claims.

What is claimed is:

1. A mold for manufacturing a skin covered foamed plastic article using a skin cover having edges and trim ends attached to the edges, comprising:

an upper mold;

a lower mold to be assembled with the upper mold to form a cavity into which a liquid foam resin is to be poured over the skin cover when placed on the lower mold, the lower mold having at least one edge portion located outside of the cavity formed by assembling the lower mold and the upper mold; and at least one stopper means located on the edge portion of the lower mold, for fastening the trim ends attached to the edges of the skin cover, each stopper means having a slit through which a trim end is inserted and a top face portion to which edges of the inserted trim end are hooked when the skin cover is placed on the lower mold.

2. The mold of claim 1, wherein the upper mold has at least one concavity to form at least one space in conjunction with the edge portion of the lower mold, the stopper means being contained inside the space when the upper mold and the lower mold are assembled.

* * * * *